United States Patent
Kim et al.

(10) Patent No.: US 11,626,619 B2
(45) Date of Patent: Apr. 11, 2023

(54) NON-AQUEOUS ELECTROLYTE FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Yunhee Kim, Yongin-si (KR); Kyoung Soo Kim, Yongin-si (KR); Yongchan You, Yongin-si (KR); Erang Cho, Yongin-si (KR); Seonju Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 454 days.

(21) Appl. No.: 16/642,673

(22) PCT Filed: Aug. 1, 2018

(86) PCT No.: PCT/KR2018/008739
§ 371 (c)(1),
(2) Date: Feb. 27, 2020

(87) PCT Pub. No.: WO2019/050160
PCT Pub. Date: Mar. 14, 2019

(65) Prior Publication Data
US 2020/0203770 A1    Jun. 25, 2020

(30) Foreign Application Priority Data
Sep. 6, 2017  (KR) .......... 10-2017-0113933

(51) Int. Cl.
*H01M 10/0567*    (2010.01)
*C07F 7/08*        (2006.01)
(Continued)

(52) U.S. Cl.
CPC ......... *H01M 10/0567* (2013.01); *C07F 7/081* (2013.01); *C07F 7/0834* (2013.01);
(Continued)

(58) Field of Classification Search
CPC ... H01M 10/0567; C07F 7/081; C07F 7/0834; C07F 9/113
See application file for complete search history.

(56) References Cited

U.S. PATENT DOCUMENTS 6,350,546 B1 *  2/2002  Gan .................. H01M 10/0567
                                                          429/347
6,783,896 B2    8/2004  Tsujioka et al.
(Continued)

FOREIGN PATENT DOCUMENTS

CN        104600362 A  *  5/2015
JP        2006-253086 A    9/2006
(Continued)

OTHER PUBLICATIONS

Machine translation of JP 2016-197508 (no date).*
(Continued)

*Primary Examiner* — Amanda C. Walke
(74) *Attorney, Agent, or Firm* — Lee IP Law, P.C.

(57) ABSTRACT

The present invention relates to a non-aqueous electrolyte for a lithium secondary battery and a lithium secondary battery comprising same. The non-aqueous electrolyte comprises: a non-aqueous organic solvent; a lithium salt; a first additive containing at least one compound among compounds represented by chemical formulas 1 to 4; and a second additive containing at least one compound among compounds represented by chemical formula 5 or 6.

11 Claims, 1 Drawing Sheet

(51) Int. Cl.
  *C07F 9/113* (2006.01)
  *H01M 4/525* (2010.01)
  *H01M 10/0525* (2010.01)
  *H01M 4/02* (2006.01)

(52) U.S. Cl.
  CPC ............ *C07F 9/113* (2013.01); *H01M 4/525* (2013.01); *H01M 10/0525* (2013.01); *H01M 2004/028* (2013.01); *H01M 2300/0025* (2013.01)

(56) References Cited

U.S. PATENT DOCUMENTS

| | | | |
|---|---|---|---|
| 7,241,536 B2* | 7/2007 | Kim | H01M 10/0567 |
| | | | 429/231.1 |
| 11,094,965 B2* | 8/2021 | Asano | H01M 10/0568 |
| 11,133,530 B2* | 9/2021 | Zhu | H01M 10/0525 |
| 2008/0193852 A1 | 8/2008 | Murai | |
| 2011/0027663 A1 | 2/2011 | Ohkubo et al. | |
| 2012/0244419 A1 | 9/2012 | Kwak et al. | |
| 2014/0113186 A1 | 4/2014 | Bhat et al. | |
| 2015/0200423 A1 | 7/2015 | Mita et al. | |
| 2016/0218392 A1 | 7/2016 | Lee et al. | |
| 2020/0365940 A1* | 11/2020 | Kim | H01M 10/052 |

FOREIGN PATENT DOCUMENTS

| | | |
|---|---|---|
| JP | 2007-123097 A | 5/2007 |
| JP | 2013-145762 A | 7/2013 |
| JP | 2016-035933 A | 3/2016 |
| JP | 2016-197508 A | 11/2016 |
| KR | 10-2001-0057562 A | 7/2001 |
| KR | 10-2010-0137415 A | 12/2010 |
| KR | 10-2012-0109407 A | 10/2012 |
| KR | 10-2014-0020328 A | 2/2014 |
| KR | 10-2016-0091077 A | 8/2016 |
| KR | 10-2017-0031636 A | 3/2017 |

OTHER PUBLICATIONS

English translation of the Written Opinion of the PCT (ETWOS) (no date).*
International Search Report dated Nov. 1, 2018 for PCT/KR2018/008739.

* cited by examiner

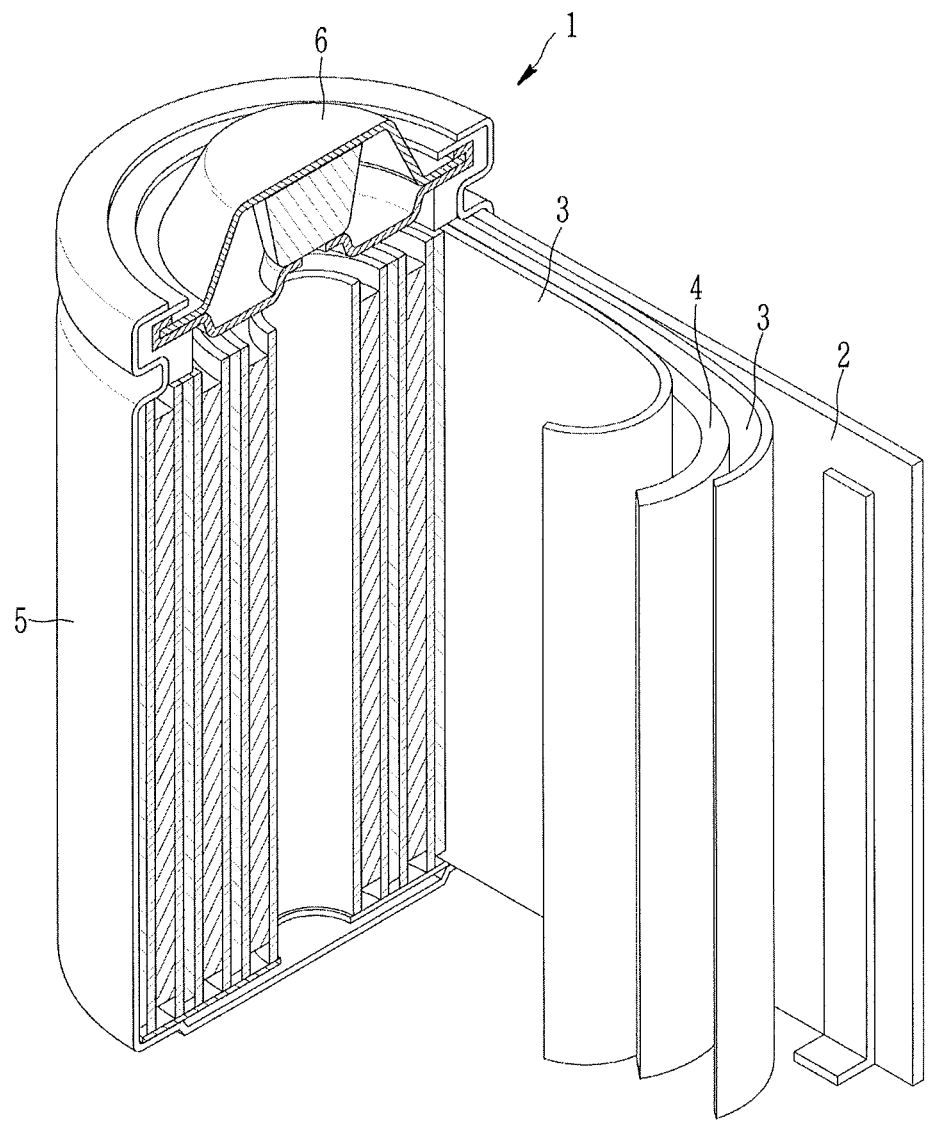

NON-AQUEOUS ELECTROLYTE FOR LITHIUM SECONDARY BATTERY AND LITHIUM SECONDARY BATTERY COMPRISING SAME

CROSS REFERENCE TO RELATED APPLICATIONS

This is the U.S. national phase application based on PCT Application No. PCT/KR2018/00873, filed Aug. 1, 2018, which is based on Korean Patent Application No. 10-2017-0113933, filed Sep. 6, 2017, the entire contents of all of which are hereby incorporated by reference.

TECHNICAL FIELD

A non-aqueous electrolyte for a lithium secondary battery and a lithium secondary battery including the same are disclosed.

BACKGROUND ART

Technology development for realizing high capacity of a lithium secondary battery has been continuously made due to an increasing demand on a mobile equipment or a portable battery.

As for a positive active material of a lithium secondary battery, a lithium-transition metal oxide having a structure capable of intercalating lithium ions such as $LiCoO_2$, $LiMn_2O_4$, $LiNi_{1-x}Co_xO_2$ (0<x<1), and the like has been used.

As for a negative active material for a lithium secondary battery, various carbon-based materials including artificial graphite, natural graphite, and hard carbon capable of intercalating and deintercalating lithium ions have been used.

As for electrolytes of a lithium secondary battery, an organic solvent in which a lithium salt is dissolved has been used.

DISCLOSURE

Technical Problem

An embodiment provides a non-aqueous electrolyte for a lithium secondary battery capable of improving cycle-life characteristics of a lithium secondary battery and reducing a resistance increase rate.

Another embodiment provides a lithium secondary battery including the electrolyte.

Technical Solution

According to an embodiment, a non-aqueous electrolyte for a lithium secondary battery includes a non-aqueous organic solvent; a lithium salt; a first additive including at least one of compounds represented by Chemical Formulae 1 to 4; and a second additive including a compound represented by Chemical Formula 5 or 6.

[Chemical Formula 1]

$$R^2-\underset{\underset{R^3}{|}}{\overset{\overset{R^1}{|}}{Si}}-O-\underset{\underset{O}{\|}}{\overset{\overset{O}{\|}}{S}}-O-\underset{\underset{R^4}{|}}{\overset{\overset{R^6}{|}}{Si}}-R^5$$

[Chemical Formula 2]

$$CX_3SO_3-\underset{\underset{R^7}{|}}{\overset{\overset{R^8}{|}}{Si}}-CX_3SO_3$$

[Chemical Formula 3]

$$R^9-\underset{\underset{O}{\|}}{\overset{\overset{O}{\|}}{S}}-O-Si(C_{m1}H_{2m1+1})_3$$

[Chemical Formula 4]

$$C_nX_{2n+1}-\underset{\underset{O}{\|}}{\overset{\overset{O}{\|}}{S}}-O-Si(C_{m2}H_{2m2+1})_3$$

In Chemical Formulae 1 to 4,
$R^1$ to $R^9$ are independently a substituted or unsubstituted, primary, secondary, or tertiary alkyl group, a substituted or unsubstituted alkenyl group, or a substituted or unsubstituted aryl group, X is hydrogen or a halogen atom,
n is an integer of 0 to 3, and
m1 and m2 are independently an integer of 0 to 3.

[Chemical Formula 5]

[Chemical Formula 6]

In Chemical Formulae 5 and 6,
$R^{10}$ to $R^{27}$ are independently a substituted or unsubstituted, primary, secondary, or tertiary alkyl group, a substituted or unsubstituted alkenyl group, or a substituted or unsubstituted aryl group.

An amount of the first additive may be 0.1 wt % to 10 wt %, or according to an embodiment, 0.5 wt % to 7 wt % based on a total weight of the electrolyte.

An amount of the second additive may be 0.1 wt % to 10 wt %, according to an embodiment, 0.5 wt % to 7 wt % based on a total weight of the electrolyte.

A mixing ratio of the first additive and the second additive may be a weight ratio of 10:1 to 0.08:1, or according to an embodiment, the mixing ratio of the first additive and the second additive may be a weight ratio of 7:1 to 0.1:1.

According to another embodiment, a lithium secondary battery includes a negative electrode including negative active material; a positive electrode including a positive active material; and the electrolyte.

In an embodiment, the positive active material may be a lithium nickel-based compound.

The positive active material may be a lithium nickel-based compound of Chemical Formula 7.

$$Li_{a1}Ni_{x1}Co_{y1}A_{z1}O_2 \quad \text{[Chemical Formula 7]}$$

In Chemical Formula 7,
0.9≤a1≤1.1, 0.6≤x1≤0.90, 0.01≤y1≤0.3, 0.01≤z1≤0.3, x1+y1+z1=1, and A is Mn or Al.

Other embodiments are included in the following detailed description.

Advantageous Effects

The non-aqueous electrolyte for a lithium secondary battery according to an embodiment may improve a resistance increase rate during storage and thus enhance an output maintenance rate and reduce a gas generation amount and in addition, provide a lithium secondary battery having improved room temperature cycle-life characteristics.

DESCRIPTION OF THE DRAWINGS

The FIGURE is a schematic view showing a lithium secondary battery according to an embodiment of the present invention.

MODE FOR INVENTION

Hereinafter, embodiments of the present invention are described in detail. However, these embodiments are exemplary, the present invention is not limited thereto and the present invention is defined by the scope of claims.

An embodiment of the present invention provides a non-aqueous electrolyte for a lithium secondary battery including a non-aqueous organic solvent; a lithium salt; a first additive including at least one of compounds represented by Chemical Formulae 1 to 4; and a second additive including a compound represented by Chemical Formula 5 or 6.

[Chemical Formula 1]

$$R^2-\underset{\underset{R^3}{|}}{\overset{\overset{R^1}{|}}{Si}}-O-\underset{\underset{O}{||}}{\overset{\overset{O}{||}}{S}}-O-\underset{\underset{R^4}{|}}{\overset{\overset{R^6}{|}}{Si}}-R^5$$

[Chemical Formula 2]

$$CX_3SO_3-\underset{\underset{R^7}{|}}{\overset{\overset{R^8}{|}}{Si}}-CX_3SO_3$$

[Chemical Formula 3]

$$R^9-\underset{\underset{O}{||}}{\overset{\overset{O}{||}}{S}}-O-Si(C_{m1}H_{2m1+1})_3$$

[Chemical Formula 4]

$$C_nX_{2n+1}-\underset{\underset{O}{||}}{\overset{\overset{O}{||}}{S}}-O-Si(C_{m2}H_{2m2+1})_3$$

In Chemical Formulae 1 to 4,
$R^1$ to $R^9$ are independently a substituted or unsubstituted, primary, secondary, or tertiary alkyl group, a substituted or unsubstituted alkenyl group, or a substituted or unsubstituted aryl group, X is hydrogen or a halogen atom, n is an integer of 0 to 3, and
m1 and m2 are independently an integer of 0 to 3.

[Chemical Formula 5]

$$R^{11}-\underset{\underset{R^{12}}{|}}{\overset{\overset{R^{10}}{|}}{Si}}-O-\underset{\underset{O}{|}}{\overset{\overset{O}{||}}{P}}-O-\underset{\underset{R^{16}}{|}}{\overset{\overset{R^{18}}{|}}{Si}}-R^{17}$$
$$\underset{\underset{R^{14}}{|}}{\overset{}{R^{13}}}-Si-R^{15}$$

[Chemical Formula 6]

$$R^{25}-\underset{\underset{O}{|}}{\overset{\overset{R^{26}}{|}}{Si}}-R^{27}$$
$$R^{20}-\underset{\underset{R^{21}}{|}}{\overset{\overset{R^{19}}{|}}{Si}}-O-\underset{}{\overset{}{P}}-O-\underset{\underset{R^{22}}{|}}{\overset{\overset{R^{24}}{|}}{Si}}-R^{23}$$

In Chemical Formulae 5 and 6,
$R^{10}$ to $R^{27}$ are independently a substituted or unsubstituted, primary, secondary, or tertiary alkyl group, a substituted or unsubstituted alkenyl group, or a substituted or unsubstituted aryl group.

In Chemical Formulae 1 to 6, the alkyl group may be a C1 to C9 alkyl group, the alkenyl group may be a C2 to C9 alkenyl group, and the aryl group may be a C6 to C12 aryl group. The halogen atom may be F, Cl, Br, I, or a combination thereof.

In Chemical Formulae 1 to 6, in the substituted alkyl group, substituted alkenyl group, and substituted aryl group, the substituent may be a halogen atom such as F, Cl, Br, or I, an alkoxy group such as methoxy, ethoxy, or propoxy, and the like, cyano (—CN), isocyanate (—NCO), or isothiocyanate (—NCS).

An amount of the first additive may be 0.1 wt % to 10 wt %, or according to an embodiment, 0.5 wt % to 7 wt % based on a total weight of the electrolyte. When the amount of the first additive is within the range, an excellent negative electrode protecting effect may be obtained, and accordingly, cycle performance may be much improved. However, when the amount of the first additive is out of the range, the negative electrode protecting effect may be deteriorated, and there may be a problem of deteriorating room temperature cycle performance.

An amount of the second additive may be 0.1 wt % to 10 wt %, or according to an embodiment, 0.5 wt % to 7 wt % based on a total weight of the electrolyte. When the amount of the second additive is within the range, a film may be more sufficiently formed and more promote Li$^+$ ion mobility and accordingly, much improve cycle-life characteristics. When the amount of the second additive is out of the range, the film may be insufficiently formed or the larger amount than the range hinders the Li$^+$ ion mobility, and accordingly, there may be a problem of sharply deteriorating a cycle-life.

A mixing ratio of the first additive and the second additive may be a 10:1 to 0.08:1 weight ratio, or according to an embodiment, the mixing ratio of the first additive and the second additive may be a weight ratio of 7:1 to 0.1:1.

When the mixing ratio of the first and second, additives is within the range, film stability may be much improved, and electrolyte solution thermal stability may be much improved. However, when the mixing ratio of the first and second additives is out of the range, that is, the first additive is excessively 10 times or more or 0.1 times or less than the second additive, a side reaction of hindering the film stability, deteriorating the electrolyte solution thermal stability, and the like may be greatly generated.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, t-butyl acetate, methylpropionate, ethylpropionate, propylpropionate, γ-butyrolactone, decanolide, valerolactone, mevalonolactone, caprolactone, and the like.

The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like.

The alcohol-based solvent may include ethanol, isopropyl alcohol, and the like and the aprotic solvent may include nitriles such as T-CN (wherein T is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable cell performance.

When the non-aqueous organic solvent is used in a mixture, a mixed solvent of cyclic carbonate and chain carbonate; a mixed solvent of cyclic carbonate and a propionate-based solvent; or a mixed solvent of cyclic carbonate, chain carbonate, and a propionate-based solvent may be used. The propionate-based solvent may be methylpropionate, ethylpropionate, propylpropionate, or a combination thereof.

Herein, when the cyclic carbonate and the chain carbonate or the cyclic carbonate and the propionate-based solvent are mixed, they may be mixed in a volume ratio of 1:1 to 1:9 and thus performance of an electrolyte solution may be improved. In addition, when the cyclic carbonate, the chain carbonate, and the propionate-based solvent are mixed, they may be mixed in a volume ratio of 1:1:1 to 3:3:4. The mixing ratios of the solvents may be appropriately adjusted according to desirable properties.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 8.

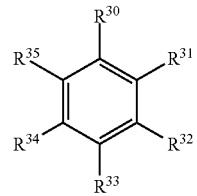

[Chemical Formula 8]

In Chemical Formula 8, $R^{30}$ to $R^{35}$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte for the lithium secondary battery may further include an ethylene carbonate-based compound represented by Chemical Formula 9 in order to improve a battery cycle-life.

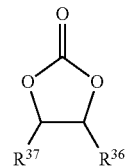

[Chemical Formula 9]

In Chemical Formula 9, $R^{36}$ and $R^{37}$ are independently hydrogen, a halogen, a cyano group (CN), a nitro group ($NO_2$), and a fluorinated C1 to C5 alkyl group, provided that at least one of $R^{36}$ and $R^{37}$ is selected from a halogen, a cyano group (CN), a nitro group ($NO_2$), and a fluorinated C1 to C5 alkyl group, and $R^{36}$ and $R^{37}$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. When such an additive for improving cycle-life is further used, the amount may be controlled within an appropriate range.

The lithium salt dissolved in an organic solvent supplies lithium ions in a battery, enables a basic operation of a lithium secondary battery, and improves transportation of the lithium ions between positive and negative electrodes. Examples of the lithium salt include at least one supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20, LiCl, LiI, and LiB(C$_2$O$_4$)$_2$ (lithium bis(oxalato) borate:LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment provides a lithium secondary battery including the electrolyte, a positive electrode including a positive active material, and a negative electrode including negative active material.

The positive active material may be a compound (lithiated intercalation compound) capable of intercalating and deintercallating lithium, and for example a lithium nickel-based compound may be appropriately used. The lithium nickel-based compound may be a compound having a high nickel content represented by Chemical Formula 7.

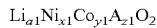
Li$_{a1}$Ni$_{x1}$Co$_{y1}$A$_{z1}$O$_2$ [Chemical Formula 7]

In Chemical Formula 7,
0.9≤a1≤1.1, 0.6≤x1≤0.90, 0.01≤y1≤0.3, 0.01≤z1≤0.3, x1+y1+z1=1, and A is Mn or Al.

In this way, when a lithium nickel-based compound is used as a positive active material, and an electrolyte including the first and second additives is used therewith, an effect of improving room temperature capacity retention and reducing a resistance variation rate when stored at room temperature may be much increased.

Particularly, using the high nickel-based positive active material having a high nickel content represented by Chemical Formula 7 as the positive active material may further maximize the effect of improving the room temperature capacity retention and decreasing the room temperature resistance increase rate.

The positive electrode includes a current collector and a positive electrode active material layer formed on the current collector and including a positive electrode active material.

In the positive electrode, a content of the positive active material may be 90 wt % to 98 wt % based on the total weight of the positive active material layer.

In an embodiment of the present disclosure, the positive active material layer may further include a binder and a conductive material. Herein, each amount of the binder and the conductive material may be 1 wt % to 5 wt % based on the total weight of the positive active material layer.

The binder acts to adhere the positive active material particles to each other well, and also serves to adhere the positive electrode active material to the current collector well. Examples of the binder may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The negative electrode includes a current collector and a negative active material layer formed on the current collector and including a negative active material.

The negative electrode active material layer may include a negative active material and a binder, and may further include a conductive material.

The negative active material may be a material that reversibly intercalates/deintercalates lithium ions, a lithium metal, a lithium metal alloy, a material capable of doping/dedoping lithium, or a transition metal oxide.

The material that reversibly intercalates/deintercalates lithium ions includes carbon materials and the carbon material may be any generally-used carbon-based negative active material in a lithium secondary battery. Examples of the carbon-based negative active material include crystalline carbon, amorphous carbon or a mixture thereof. The crystalline carbon may be a unspecified shaped, or sheet, flake, spherical, or fiber shaped natural graphite or artificial graphite and the amorphous carbon may be a soft carbon, a hard carbon, a mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material capable of doping and dedoping lithium may include Si, SiO$_x$ (0<x<2), a Si-Q alloy (wherein Q is an element selected from the group consisting of an alkali metal, an alkaline-earth metal, a Group 13 element, a Group 14 element, a Group 15 element, a Group 16 element, a transition element, a rare earth element, and a combination thereof, and is not Si), a Si-carbon composite, Sn, SnO$_2$, Sn—R alloy (wherein R is an element selected from the group consisting of an alkali metal, an alkaline-earth metal, a Group 13 element, a Group 14 element, a Group 15 element, a Group 16 element, a transition element, a rare earth element, and a combination thereof, and not Sn), a Sn-carbon composite, and the like. At least one of these materials may be mixed with SiO$_2$. The elements Q and R may be one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The Si-based active material may include Si, SiO$_x$ (0<x<2), a Si-Q alloy (wherein Q is an element selected from the group consisting of an alkali metal, an alkaline-earth metal, a Group 13 element, a Group 14 element, a Group 15 element, a Group 16 element, a transition element, a rare earth element, and a combination thereof, and is not Si), a Si-carbon composite, Sn, SnO$_2$, a Sn—R alloy (wherein R is an element selected from the group consisting of an alkali metal, an alkaline-earth metal, a Group 13 element, a Group 14 element, a Group 15 element, a Group 16 element, a transition element, a rare earth element, and a combination thereof, and not Sn), a Sn-carbon composite, and the like. At least one of these materials may be mixed with SiO$_2$. The elements Q and R may be one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include a lithium titanium oxide.

According to an embodiment, the negative active material may be an Si-carbon composite, and this Si-carbon composite may include silicon particles and crystalline carbon. These silicon particles may have an average particle diameter (D50) of 10 nm to 200 nm. The Si—C composite may further include an amorphous carbon layer formed at least a part thereof. As used herein, when a definition is not otherwise provided, an average particle diameter (D50) indicates a diameter of a particle where a cumulative volume is 50 volume % in a particle distribution.

According to another embodiment, the negative active material may be used by mixing two or more different types of negative active materials, for example, include the Si-carbon composite as a first negative active material and crystalline carbon as a second negative active material. When the negative active material is used by mixing two or more types of negative active materials, a mixing ratio thereof may be appropriately adjusted, but it may be desirable to adjust the mixing ratio to have an Si content in a range of 3 wt % to 50 wt % based on a total weight of the negative active material.

In the negative active material layer, the negative active material may be included in an amount of 95 wt % to 99 wt % based on the total weight of the negative active material layer. In the negative active material layer, a content of the binder may be 1 wt % to 5 wt % based on the total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder acts to adhere negative active material particles to each other well and also adheres negative active materials to the current collector. The binder may include a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, denka black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The positive active material layer and the negative active material layer may be formed by mixing the active material, the binder, and optionally the conductive material in a solvent to prepare an active material composition and coating the active material composition on a current collector. The manufacturing method of the active material layers is well known, and thus is not described in detail in the present disclosure. The solvent includes N-methyl pyrrolidone and the like, but is not limited thereto. In addition, when a water-soluble binder is used for the negative active material layer, water may be used as a solvent when preparing a negative active material composition.

In addition, a separator may be disposed between the positive electrode and the negative electrode depending on a type of the lithium secondary battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

The FIGURE is an exploded perspective view of a lithium secondary battery according to an embodiment. The lithium secondary battery according to an embodiment is illustrated as a cylindrical battery, but is not limited thereto and may include variously-shaped batteries such as a prismatic or pouch-type battery.

Referring to the FIGURE, a lithium secondary battery 1 according to an embodiment includes an electrode assembly manufactured by winding a separator 3 interposed between a positive electrode 2 and a negative electrode 4, a case 5 housing the electrode assembly, and a sealing member 6 sealing the case 5. The positive electrode 2, the negative electrode 4, and the separator 3 may be impregnated in an electrolyte solution (not shown).

EXAMPLES FOR PERFORMING INVENTION

Hereinafter, examples of the present invention and comparative examples are described. These examples, however, are not in any sense to be interpreted as limiting the scope of the invention.

Examples 1 to 8 and Comparative Examples 1 to 3 and 7 to 12

Non-aqueous electrolytes for a lithium secondary battery were prepared by adding 1.15 M $LiPF_6$ to a mixed solvent (20:40:40 volume ratio) of ethylene carbonate, ethylmethyl carbonate, and dimethyl carbonate, and then, first and second additives to 100 wt % of the obtained mixture in each composition shown in Table 1.

The non-aqueous electrolytes, a positive electrode, and a negative electrode were used to manufacture cylindrical lithium secondary battery cells in a general method. Herein, 3 g of an electrolyte was injected thereinto.

The positive electrode was manufactured by mixing 96 wt % of a $LiNi_{0.6}Co_{0.2}Al_{0.2}O_2$ positive active material, 2 wt % of ketjen black conductive material, and 2 wt % of polyvinylidene fluoride in an N-methylpyrrolidone solvent to prepare positive active material slurry, coating the positive active material slurry on an aluminum foil, and then, drying and compressing it.

The negative electrode was manufactured by mixing 96 wt % of an artificial graphite negative active material, 2 wt % of a ketjen black conductive material, and 2 wt % of polyvinylidene fluoride in an N-methylpyrrolidone solvent to prepare negative active material slurry, coating the negative active material slurry on a copper foil, and then, drying and compressing it.

Comparative Examples 4 to 6

Non-aqueous electrolytes for a lithium secondary battery were prepared by adding 1.15 M LiPF$_6$ to a mixed solvent (20:40:40 volume ratio) of ethylene carbonate, ethylmethylcarbonate, and dimethyl carbonate, and then, fluoroethylene carbonate (FEC), first additive, and second additive to 100 wt % of the obtained mixture in each composition shown in Table 1.

The non-aqueous electrolytes, a positive electrode, and a negative electrode were used to manufacture cylindrical lithium secondary battery cells in a general method. Herein, 3 g of an electrolyte was injected thereinto.

The positive electrode was manufactured by mixing 96 wt % of a LiNi$_{0.5}$Co$_{0.2}$Mn$_{0.3}$O$_2$ positive active material, 2 wt % of ketjen black conductive material, and 2 wt % of polyvinylidene fluoride in an N-methylpyrrolidone solvent to prepare positive active material slurry, coating the positive active material slurry on an aluminum foil, and then, drying and compressing it.

The negative electrode was manufactured by mixing 96 wt % of an artificial graphite negative active material, 2 wt % of a ketjen black conductive material, and 2 wt % of polyvinylidene fluoride in an N-methylpyrrolidone solvent to prepare negative active material slurry, coating the negative active material slurry on a copper foil, and then, drying and compressing it.

The lithium secondary battery cells according to Examples 1 to 11 and Comparative Examples 1 to 12 were respectively 300 times charged and discharged at 1.0 C at room temperature of 25° C., and then, a ratio of discharge capacity at the 300$^{th}$ cycle relative to discharge capacity at the first cycle was calculated, and the results are shown as room temperature capacity retention in Table 1.

In addition, the lithium secondary battery cells were respectively 300 times charged and discharged at 1.0 C at room temperature of 25° C., and resistances of the cells before and after the 300th cycle were respectively measured to calculate resistance variation rates. The results are shown in Table 1.

TABLE 1

| | First additive (wt %) | | | | | Second additive (wt %) | | | Weight ratio of First additive: Second additive | Room temperature capacity retention (%) | Room temperature cycle-life resistance variation rate (%) |
|---|---|---|---|---|---|---|---|---|---|---|---|
| | TESS | TMSES | DEMSS | ESA | PS | TMSPi | TMSPa | TESPa | | | |
| Example 1 | 0.5 | 0 | 0 | 0 | 0 | 1 | 0 | 0 | 2:1 | 82 | 35 |
| Example 2 | 1 | 0 | 0 | 0 | 0 | 1 | 0 | 0 | 1:1 | 83 | 33 |
| Example 3 | 0.5 | 0 | 0 | 0 | 0 | 0 | 1 | 0 | 2:1 | 82 | 31 |
| Example 4 | 1 | 0 | 0 | 0 | 0 | 0 | 1 | 0 | 1:1 | 84 | 33 |
| Example 5 | 3 | 0 | 0 | 0 | 0 | 0 | 1 | 0 | 3:1 | 86 | 30 |
| Example 6 | 5 | 0 | 0 | 0 | 0 | 0 | 1 | 0 | 5:1 | 87 | 29 |
| Example 7 | 0.5 | 0 | 0 | 0 | 0 | 0.5 | 0 | 0 | 1:1 | 82 | 49 |
| Example 8 | 0.5 | 0 | 0 | 00 | 0 | 3 | 0 | 0 | 0.17:1 | 85 | 30 |
| Example 9 | 0.5 | 0 | 0 | 0 | 0 | 5 | 0 | 0 | 0.1:1 | 84 | 25 |
| Example 10 | 0 | 1 | 0 | 0 | 0 | 0 | 1 | 0 | 1:1 | 81 | 30 |
| Example 11 | 0 | 0 | 1 | 0 | 0 | 0 | 0 | 1 | 1:1 | 85 | 24 |
| Comparative Example 1 | 0 | 0 | 0 | 0 | 0 | 0 | 0 | 0 | 0 | 67 | 108 |
| Comparative Example 2 | 0.5 | 0 | 0 | 0 | 0 | 0 | 0 | 0 | 0 | 76 | 64 |
| Comparative Example 3 | 0 | 0 | 0 | 0 | 0 | 1 | 0 | 0 | 0 | 72 | 54 |
| Comparative Example 4 | 0 | 0 | 0 | 0 | 0 | 0 | 0 | 0 | 0 | 85 | 21 |
| Comparative Example 5 | 1 | 0 | 0 | 0 | 0 | 0 | 1 | 0 | 1:1 | 78 | 34 |
| Comparative Example 6 | 0 | 1 | 0 | 0 | 0 | 0 | 1 | 0 | 1:1 | 70 | 42 |
| Comparative Example 7 | 0.05 | 0 | 0 | 0 | 0 | 0 | 1 | 0 | 0.05:1 | 73 | 60 |
| Comparative Example 8 | 12 | 0 | 0 | 0 | 0 | 0 | 1 | 0 | 12:1 | 65 | 110 |
| Comparative Example 9 | 0 | 1 | 0 | 0 | 0 | 0.05 | 0 | 0 | 20:1 | 72 | 61 |
| Comparative Example 10 | 0 | 1 | 0 | 0 | 0 | 13 | 0 | 0 | 0.077:1 | 53 | 184 |
| Comparative Example 11 | 0 | 0 | 0 | 1 | 0 | 1 | 0 | 0 | 1:1 | 62 | 143 |
| Comparative Example 12 | 0 | 0 | 0 | 0 | 1 | 0 | 1 | 0 | 1:1 | 50 | 209 |

In Table 1, TESS is bis(triethylsilyl) sulfate (Chemical Formula 1a), TMSES is triethylsilyl methane sulfonate (Chemical Formula 3a), DESMSS is diethylbis(trifluoromethanesulfonyloxy)silane (Chemical Formula 2a), TMSPi is trimethylsilyl phosphite (Chemical Formula 6a), TMSPa is trimethylsilyl phosphate (Chemical Formula 5a), TESPa is triethylsilyl phosphate (Chemical Formula 5b), ESA is ethylene sulfate (Chemical Formula 10), and PS is propane sultone (Chemical Formula 11).

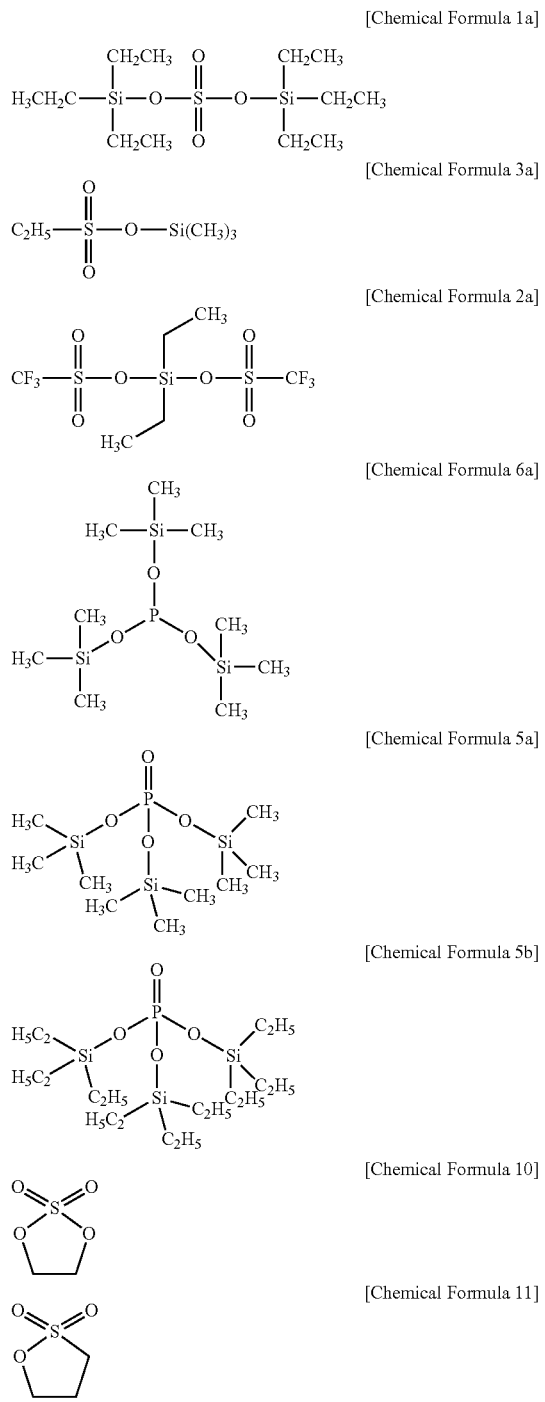

As shown in Table 1, the lithium secondary battery cells of Examples 1 to 11 using a nickel-based positive active material having a high Ni content of 60 mol % as a positive active material and electrolytes including a first additive ranging from 0.1 wt % to 10 wt % and a second additive ranging from 0.1 wt % to 10 wt % in a weight ratio of 10:1 to 0.08:1 exhibited excellent room temperature capacity retention and a low room temperature resistance variation rate.

On the contrary, even though the same positive active material as Examples was used, Comparative Example 1 using no first and second additives or Comparative Examples 2 and 3 including only one first or second additive exhibited deteriorated room temperature capacity retention and a large resistance variation rate.

In addition, Comparative Examples 4 to 6 using a nickel-based positive active material having a low nickel content of 50 mol % as a positive active material and the first and second additives in an electrolyte exhibited rather deteriorated room temperature capacity retention and rather increased room temperature resistance maintenance rate.

Resultantly, a lithium secondary battery cell using a nickel-based positive active material having a high Ni content mole ratio of 60 mol % as a positive active material and using the first and second additives in an electrolyte may much improve room temperature cycle-life characteristics, greatly deteriorate a room temperature resistance variation rate, but a lithium secondary battery cell using a nickel-based positive active material having a low Ni content mole ratio of 50 mol % as a positive active material has no effect of using the first and second additives for the electrolyte but is rather deteriorated.

In addition, even though the positive active material was equally used like Examples, when the first additive was used in a small amount or in a large amount (Comparative Example 7, Comparative Example 8), or the second additive was used in a small amount or a large amount (Comparative Example 9 and 10), the room temperature capacity retention was deteriorated, and the room temperature resistance increase rate was increased.

Furthermore, when a cyclic compound including no Si as the first additive was used (Comparative Examples 11 and 12), the room temperature capacity retention was deteriorated, and the room temperature resistance increase rate was increased.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A non-aqueous electrolyte for a lithium secondary battery, the electrolyte comprising:

a non-aqueous organic solvent;

a lithium salt;

a first additive comprising at least one of compounds represented by Chemical Formulae 1 to 4; and a second additive including a compound represented by Chemical Formula 5 or 6:

[Chemical Formula 1]

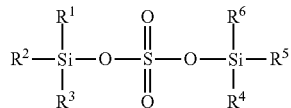

[Chemical Formula 2]

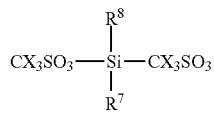

[Chemical Formula 3]

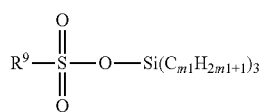

[Chemical Formula 4]

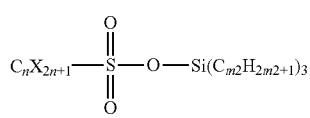

wherein, in Chemical Formulae 1 to 4, $R^1$ to $R^8$ are independently a substituted or unsubstituted, primary, secondary, or tertiary alkyl group, a substituted or unsubstituted alkenyl group, or a substituted or unsubstituted aryl group, $R^9$ is a substituted or unsubstituted, primary, secondary, or tertiary alkyl group or a substituted or unsubstituted aryl group, X is hydrogen or a halogen atom, n is an integer of 0 to 3, and m1 and m2 are independently an integer of 0 to 3,

[Chemical Formula 5]

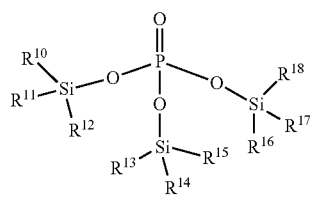

[Chemical Formula 6]

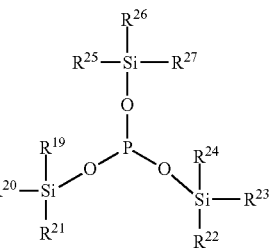

wherein, in Chemical Formulae 5 and 6, $R^{10}$ to $R^{27}$ are independently a substituted or unsubstituted, primary, secondary, or tertiary alkyl group, a substituted or unsubstituted alkenyl group, or a substituted or unsubstituted aryl group.

2. The non-aqueous electrolyte for the lithium secondary battery of claim 1, wherein an amount of the first additive is 0.1 wt % to 10 wt % based on a total weight of the electrolyte.

3. The non-aqueous electrolyte for the lithium secondary battery of claim 1, wherein an amount of the first additive is 0.5 wt % to 7 wt % based on a total weight of the electrolyte.

4. The non-aqueous electrolyte for the lithium secondary battery of claim 1, wherein an amount of the second additive is 0.1 wt % to 10 wt % based on a total weight of the electrolyte.

5. The non-aqueous electrolyte for the lithium secondary battery of claim 1, wherein an amount of the second additive is 0.5 wt % to 7 wt % based on a total weight of the electrolyte.

6. The non-aqueous electrolyte for the lithium secondary battery of claim 1, wherein a mixing ratio of the first additive and the second additive is a weight ratio of 10:1 to 0.08:1.

7. The non-aqueous electrolyte for the lithium secondary battery of claim 1, wherein a mixing ratio of the first additive and the second additive is a weight ratio of 7:1 to 0.1:1.

8. A lithium secondary battery comprising
a negative electrode including negative active material;
a positive electrode including a positive active material; and
the non-aqueous electrolyte of claim 1.

9. The lithium secondary battery of claim 8, wherein the positive active material is a lithium nickel-based compound.

10. The lithium secondary battery of claim 9, wherein the positive active material is a lithium nickel-based compound of Chemical Formula 7:

$$Li_{a1}Ni_{x1}Co_{y1}A_{z1}O_2$$ [Chemical Formula 7]

wherein, in Chemical Formula 7, $0.9 \leq a1 \leq 1.1$, $0.6 \leq x1 \leq 0.90$, $0.01 \leq y1 \leq 0.3$, $0.01 \leq z1 \leq 0.3$, $x1+y1+z1 = 1$, and A is Mn or Al.

11. The non-aqueous electrolyte for the lithium secondary battery of claim 1, wherein $R^{10}$ to $R^{27}$ are independently a substituted or unsubstituted alkenyl group or a substituted or unsubstituted aryl group.

* * * * *